United States Patent
Jung et al.

(10) Patent No.: US 8,861,183 B2
(45) Date of Patent: Oct. 14, 2014

(54) ELECTRIC DOUBLE LAYER CAPACITOR

(75) Inventors: Chang Ryul Jung, Seoul (KR); Bae Kyun Kim, Gyeonggi-do (KR); Yeong Su Cho, Gyeonggi-do (KR); Hak Kwan Kim, Seoul (KR); Jun Hee Bae, Seoul (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 57 days.

(21) Appl. No.: 13/489,115

(22) Filed: Jun. 5, 2012

(65) Prior Publication Data

US 2013/0100581 A1    Apr. 25, 2013

(30) Foreign Application Priority Data

Oct. 21, 2011    (KR) .......................... 10-2011-0108132

(51) Int. Cl.
| | | |
|---|---|---|
| *H01G 9/155* | (2006.01) | |
| *H01G 11/36* | (2013.01) | |
| *H01G 11/28* | (2013.01) | |
| *H01G 11/32* | (2013.01) | |
| *H01G 11/40* | (2013.01) | |
| *H01G 11/68* | (2013.01) | |
| *H01G 11/24* | (2013.01) | |

(52) U.S. Cl.
CPC ............... *H01G 11/28* (2013.01); *H01G 11/36* (2013.01); *H01G 11/40* (2013.01); *H01G 11/68* (2013.01); *Y02T 10/7022* (2013.01); *H01G 11/32* (2013.01); *H01G 11/24* (2013.01); *Y02E 60/13* (2013.01)
USPC .......................................................... 361/502

(58) Field of Classification Search
USPC .......................................................... 361/502
See application file for complete search history.

(56) References Cited

U.S. PATENT DOCUMENTS 7,646,587 B2 *    1/2010    Ohmori .......................... 361/502

FOREIGN PATENT DOCUMENTS

JP    2007-194090    8/2007
KR    10-2008-0036261 A    4/2008

* cited by examiner

*Primary Examiner* — Eric Thomas
(74) *Attorney, Agent, or Firm* — McDermott Will & Emery LLP

(57) ABSTRACT

An electric double layer capacitor includes an anode and a cathode. The anode includes an anode current collector, and a conductive layer and an anode active material layer, on the anode current collector. The cathode includes a cathode current collector and a cathode active material layer on the cathode current collector. The conductive layer includes a conductive material with electrical conductivity of $10^{-2}$ to $10^{-3}$ S/cm.

8 Claims, 2 Drawing Sheets

PRIOR ART

ELECTRIC DOUBLE LAYER CAPACITOR

CROSS-REFERENCE TO RELATED APPLICATIONS

Claim and incorporate by reference domestic priority application and foreign priority application as follows:

CROSS REFERENCE TO RELATED APPLICATION

This application claims the benefit under 35 U.S.C. Section 119 of Korean Patent Application Serial No. 10-2011-0108132, entitled filed Oct. 21, 2011, which is hereby incorporated by reference in its entirety into this application.

BACKGROUND OF THE INVENTION

1. Field of the Invention

The present invention relates to an electric double layer capacitor.

2. Description of the Related Art

A secondary battery and an electric double layer capacitor (EDLC) are mainly used for advanced functions of electronic products and stable power supply to electric vehicles and home and industrial electronic devices.

However, the secondary battery has low power density compared to the EDLC, causes environmental pollution, and has short charge/discharge cycles and risks of overcharging and exploding at high temperature. Therefore, in order to overcome these problems, recently, development of a high performance EDLC with improved energy density is actively in progress.

Recently, as application fields of the EDLC, the market is expanding to systems requiring independent power supply devices, systems of adjusting instantaneous overload, energy storage devices, and so on.

Especially, since the EDLC is highlighted in terms of excellent energy input/output (power density) compared to the secondary battery, application of the EDLC is expanding to a back-up power supply, that is, an auxiliary power supply which operates in instantaneous power failure.

Further, since the EDLC has excellent charge/discharge efficiency and life compared to the secondary battery, relatively wide available temperature and voltage range, no need for maintenance, and environmentally friendly characteristics, the EDLC is being considered as a substitute for the secondary battery.

Generally, in case of the EDLC, as in the following FIG. 1, it is known that potentials of a cathode and an anode during charge/discharge are the same, and it is reported that a high voltage can be obtained by adjusting the potential of the cathode.

A currently known electrode potential adjusting method of the EDLC increases a voltage of a cell by differentiating weights of the cathode and the anode to make a difference in resistance between the cathode and the anode.

That is, as in the following FIG. 2, in case of using the same electrode active material, there is a method of adjusting thicknesses of a cathode active material 12 and an anode active material 22 in an electrode 30 consisting of a cathode 10 including the cathode active material 12 on a cathode current collector 11 and an anode 20 including the anode active material 22 on an anode current collector 11. In this case, the method is to increase the voltage of the cell through the resistance difference between the cathode 10 and the anode 20 by increasing the thickness of the cathode active material 12.

As another method, the electrode potential is adjusted by adjusting weights of the active materials applied on the cathode and the anode.

However, since it is impossible to effectively adjust a potential difference between the cathode and the anode by the currently used methods, there is a limit to improvement of the voltage or energy density of the EDLC cell.

SUMMARY OF THE INVENTION

The present invention has been invented in order to overcome the above-described problems in manufacturing a high voltage electric double layer capacitor and it is, therefore, an object of the present invention to provide an electric double layer capacitor capable of improving energy density and a withstand voltage of a cell by adjusting a potential difference between a cathode and an anode.

In accordance with an embodiment of the present invention to achieve the object, there is provided an electric double layer capacitor including: an anode formed by applying a conductive layer and an anode active material layer on an anode current collector; and a cathode including a cathode active material layer on a cathode current collector.

The conductive layer may be formed by applying a conductive material with electrical conductivity of $10^{-2}$ to $10^{-3}$ S/cm.

The conductive layer may preferably use at least one conductive carbon selected from the group consisting of ketjen black, acetylene black, and super-P.

It is preferred that the conductive layer in accordance with the present invention is formed with a thickness of 1 to 15 μm.

The anode current collector in accordance with the present invention may use a material selected from at least one metal selected from the group consisting of aluminum, stainless steel, copper, nickel, and alloys thereof, etched metal, expanded metal, punched metal, nets, and foam.

The cathode current collector in accordance with the present invention may use a material selected from at least one metal selected from the group consisting of aluminum, stainless steel, titanium, tantalum, and niobium, etched metal, expanded metal, punched metal, nets, and foam.

The anode active material and the cathode active material may be equal to or different from each other, and each of them may be preferably at least one carbon material selected from the group consisting of activated carbon, carbon nanotube (CNT), graphite, carbon aerogel, polyacrylonitrile (PAN), carbon nanofiber (CNF), activated carbon nanofiber (ACNF), vapor grown carbon fiber (VGCF), and graphene.

In accordance with an embodiment of the present invention, it is most preferred that the anode active material and the cathode active material are activated carbon with a specific surface area of 1,500 to 3,000 $m^2/g$.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Hereinafter, the present invention will be described in detail.

Terms used herein are provided to explain embodiments, not limiting the present invention. Throughout this specification, the singular form includes the plural form unless the context clearly indicates otherwise. Further, terms "comprises" and/or "comprising" used herein specify the existence of described shapes, numbers, steps, operations, members, elements, and/or groups thereof, but do not preclude the existence or addition of one or more other shapes, numbers, operations, members, elements, and/or groups thereof.

An electric double layer capacitor in accordance with the present invention includes an anode, which is formed by applying a conductive layer and an anode active material layer on an anode current collector, and a cathode, which includes a cathode active material layer on a cathode current collector.

As a method of adjusting a potential difference of a cell by changing an electrode structure of an electric double layer capacitor cell to make a difference in resistance between the cathode and the anode, the present invention is to reduce resistance by specially applying the conductive layer before applying the active material layer on the anode current collector. In this case, it is possible to minimize capacity reduction and increase a withstand voltage of the cell by adjusting a potential difference of the cell through the resistance difference between the cathode and the anode.

Figure 1:
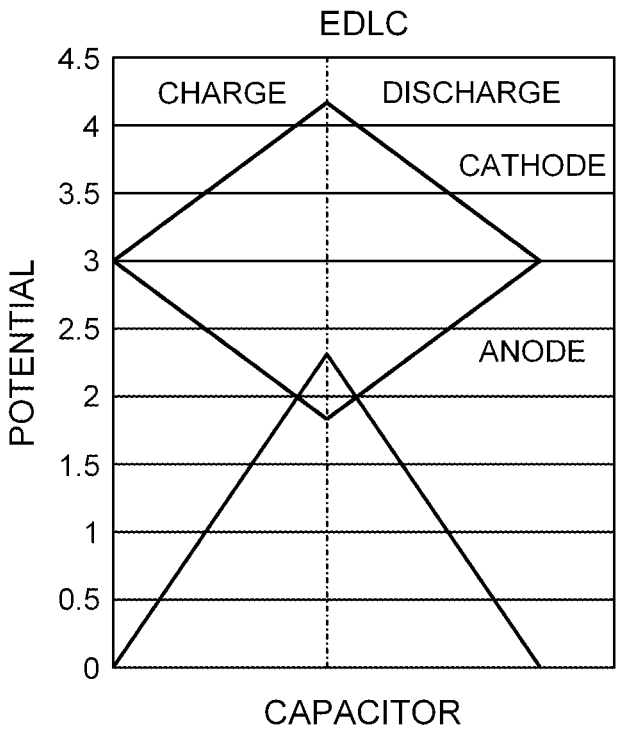
FIG. 1 is a graph of a potential value according to charge/discharge of a conventional electric double layer capacitor.
Figure 2:
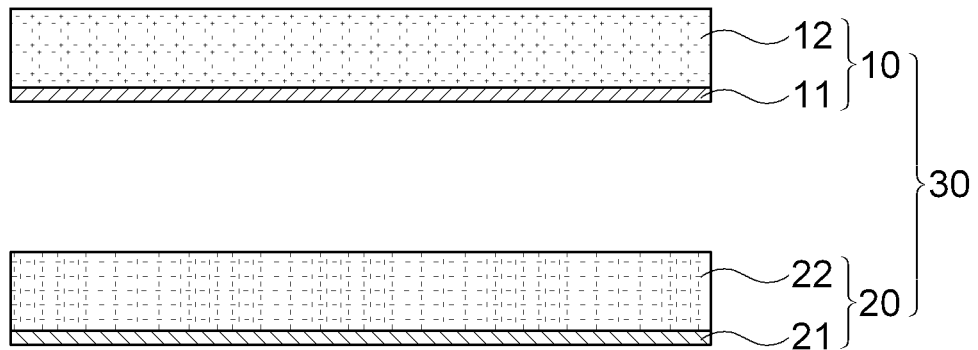
FIG. 2 is an example of a method of adjusting a potential of an electrode using a conventional method.
Figure 3:
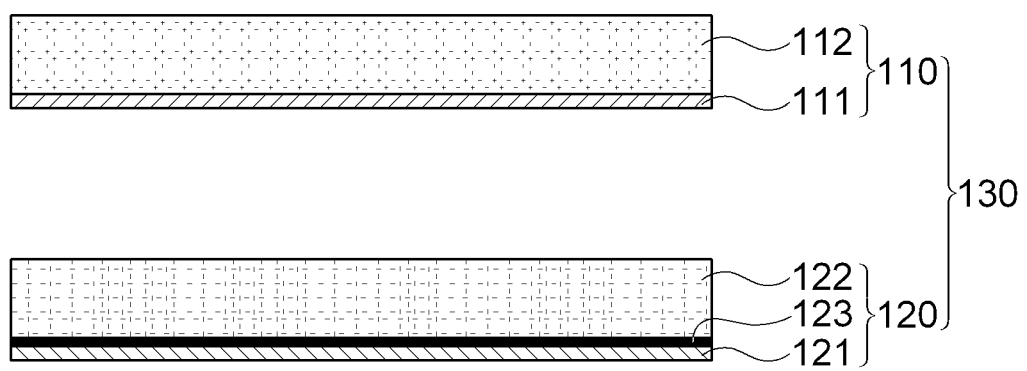
FIG. 3 shows an electrode structure in accordance with an embodiment of the present invention.

Specifically, referring to the following FIG. 3 which shows a portion of an electrode 130 structure in accordance with an embodiment of the present invention, the electrode 130 includes a cathode 110, which includes a cathode active material 112 on a cathode current collector 111, and an anode 120, which is formed by applying a conductive layer 123 on an anode current collector 121 first and applying an anode active material 122 on the conductive layer 123.

Like this, when including the conductive layer 123 on the anode current collector 121, resistance of the anode 120 is reduced compared to the cathode 110 without the conductive layer. Therefore, it is possible to adjust the potential difference of the electric double layer capacitor through the resistance difference between the cathode 110 and the anode 120.

It is preferred that the conductive layer in accordance with the present invention is formed by applying a conductive material with electrical conductivity of $10^{-2}$ to $10^{-3}$ S/cm. The conductive layer, which satisfies the above electric conductivity value, may be preferably made of at least one conductive carbon selected from the group consisting of ketjen black, acetylene black, and super-P.

In some prior arts, there are examples in which the conductive layer is formed on the electrode current collector using a conductive polymer to improve adhesion between the electrode current collector and the electrode active material. When using the conductive polymer, there is an advantage of improving the adhesion between the electrode current collector and the electrode active material, but there is a disadvantage of reducing electrical conductivity between the current collector and the electrode active material. That is, when the conductive polymer is coated between the current collector and the electrode active material, the electrical conductivity between the current collector and the electrode active material is reduced than when the current collector and the electrode active material are in direct contact with each other. Particularly, when the conductive polymer is applied on the entire surface of the current collector, the degree of reduction of the electrical conductivity becomes more serious.

Therefore, it is preferred that the conductive layer in accordance with the present invention is formed by applying the conductive carbon, not the conductive polymer, in the aspect that resistance is effectively reduced without reduction of electrical conductivity.

It is preferred that the conductive layer in accordance with the present invention is formed with a thickness of 1 to 15 μm in the aspect that capacity is not reduced while minimizing resistance.

A method of forming the conductive layer of the present invention may be selected from various methods such as a coating method and a sheet method but not particularly limited thereto.

In the electric double layer capacitor in accordance with the present invention, the cathode, which is formed by applying cathode active material slurry including the cathode active material, a conductive agent, and a binder on the cathode current collector, and the anode, which is formed by forming the conductive layer on the anode current collector and applying anode active material slurry including the anode active material, the conductive agent, and the binder on the conductive layer, are immersed in an electrolytic solution while being insulated by a separator.

Further, a mixture of the electrode active material, the conductive agent, and a solvent is formed into a sheet by the binder resin or a sheet extruded by extrusion is bonded to the current collector by a conductive adhesive.

The cathode active material and the anode active material used in the present invention may be equal to or different from each other, and each of them may be preferably at least one carbon material selected from the group consisting of activated carbon, carbon nanotube (CNT), graphite, carbon aerogel, polyacrylonitrile (PAN), carbon nanofiber (CNF), activated carbon nanofiber (ACNF), vapor grown carbon fiber (VGCF), and graphene.

In accordance with a preferable embodiment of the present invention, it is most preferable to use activated carbon with a specific surface area of 1,500 to 3,000 $m^2/g$ among the above electrode active materials.

The cathode current collector in accordance with the present invention may be made of materials used in conventional electric double layer capacitors and lithium ion batteries, for example, at least one selected from the group consisting of aluminum, stainless steel, titanium, tantalum, and niobium. Among them, aluminum is preferable.

It is preferred that a thickness of the cathode current collector is 10 to 40 μm. In addition to the above metal foils, etched metal foils or materials such as expanded metal, punched metal, nets, and foam having holes penetrating front and rear surfaces can be used as the current collector.

Further, the anode current collector in accordance with the present invention may be made of all materials used in the conventional electric double layer capacitors and lithium ion batteries, for example, aluminum, stainless steel, copper, nickel, and alloys thereof. Among them, aluminum is preferable. Further, it is preferred that a thickness of the anode current collector is 10 to 40 μm. In addition to the above metal foils, etched metal foils or materials such as expanded metal, punched metal, nets, and foam having holes penetrating front and rear surfaces can be used as the current collector.

The conductive agent included in the cathode and anode active material slurry of the present invention may be conductive powder such as super-P, ketjen black, acetylene black, carbon black, and graphite but not limited thereto, and all kinds of conductive agents used in typical electrochemical capacitors can be included.

For example, the binder resin may be at least one selected from fluorine resins such as polytetrafluoroethylene (PTFE) and polyvinylidenfluoride (PVDF); thermoplastic resins such as polyimide, polyamideimide, polyethylene (PE), and polypropylene (PP); cellulose resins such as carboxymethyl cellulose (CMC); rubber resins such as styrene-butadiene rubber (SBR); and mixtures thereof but not particularly limited thereto, and all binder resins used in the typical electrochemical capacitors can be used.

The separator in accordance with the present invention may use all materials used in the conventional electric double layer capacitors or lithium ion batteries, for example, a microporous film manufactured from at least one polymer selected from the group consisting of polyethylene (PE), polypropylene (PP), polyvinylidenfluoride (PVDF), polyvinylidene chloride, polyacrynitrile (PAN), polyacrylamide (PAAm), polytetrafluoroethylene (PTFE), polysulfone, polyether sulfone (PES), polycarbonate (PC), polyamide (PA), polyimide (PI), polyethyleneoxide (PEO), polypropylene oxide (PPO), cellulose polymers, and polyacrylic polymers. Further, a multilayer film manufactured by polymerizing the porous film may be used, and among them, cellulose polymers may be preferably used.

It is preferred that a thickness of the separator is about 15 to 35 μm but not limited thereto.

The electrolytic solution of the present invention may be organic electrolytic solutions containing non-lithium salts such as spiro salts, $TEABF_4$, and $TEMABF_4$ or lithium salts such as $LiPF_6$, $LiBF_4$, $LiCLO_4$, $LiN(CF_3SO_2)_2$, $CF_3SO_3Li$, $LiC(SO_2CF_3)_3$, $LiAsF_6$, and $LiSbF_6$ or mixtures thereof. The solvent may be at least one selected from the group consisting of acrylonitrile, ethylene carbonate, propylene carbonate, dimethyl carbonate, ethyl methyl carbonate, sulfolane, and dimethoxyethane but not limited thereto. The electrolytic solution, in which these solute and solvent are mixed, has a high withstand voltage and high electrical conductivity. It is preferred that concentration of an electrolyte in the electrolytic solution is in the range of 0.1 to 2.5 mol/L, particularly 0.5 to 2.0 mol/L.

It is preferred that a case (exterior material) of the electrochemical capacitor of the present invention uses an aluminum-containing laminate film, which is typically used in the secondary batteries and the electric double layer capacitors, but not particularly limited thereto.

The electrochemical capacitor in accordance with the present invention may be more preferably used in the electric double layer capacitor but not particularly limited thereto.

Hereinafter, preferred embodiments of the present invention will be described in detail. The following embodiments merely illustrate the present invention, and it should not be interpreted that the scope of the present invention is limited to the following embodiments. Further, although certain compounds are used in the following embodiments, it is apparent to those skilled in the art that equal or similar effects are shown even when using their equivalents.

Embodiment 1

1) Preparation of Anode

A conductive layer with a thickness of 5 μm is formed by applying super-P (electrical conductivity $10^{-3}$ S/cm) on an aluminum current collector through a coating method.

Anode active material slurry is prepared by mixing and stirring vapor activated carbon (specific surface area 1800 $m^2/g$) 123 g, super-P 15 g as a conductive agent, carboxymethyl cellulose (CMC) 3.8 g, styrene-butadiene rubber (SBR) 5.3 g, and polytetrafluoroethylene (PTFE) 2.2 g as binders, and water 473 g.

The anode active material slurry is applied on the aluminum current collector, on which the conductive layer is formed, by a comma coater, temporarily dried, and cut to an electrode size of 50 mm×100 mm. A cross-sectional thickness of the electrode is 60 μm. Before assembly of a cell, the electrode is dried in a vacuum at 120° C. for 48 hours.

2) Preparation of Cathode

Cathode active material slurry, which has the same composition as the anode active material slurry prepared in the above 1), is applied on an etched aluminum foil with a thickness of 20 μm by a comma coater, temporarily dried, and cut to an electrode size of 50 mm×100 mm. A cross-sectional thickness of the electrode is 60 μm. Before assembly of the cell, the electrode is dried in a vacuum at 120° C. for 48 hours.

3) Preparation of Electrolytic Solution

An electrolytic solution is prepared by dissolving a spiro salt in an acrylonitrile solvent so that concentration of the Spiro salt is 1.3 mol/L.

4) Assembly of Electric Double Layer Capacitor Cell

The prepared electrodes (cathode, anode) are immersed in the electrolytic solution with a separator (TF4035 from NKK, cellulose separator) interposed therebetween and put in a laminate film case to be sealed.

Comparative Example 1

An electric double layer capacitor is manufactured by the same process as the embodiment 1 except for directly applying anode active material slurry on a copper current collector without the step of forming a conductive layer during preparation of an anode.

Experimental Example

Estimation of Capacity and Resistance of Electrochemical Capacitor Cell

Capacity of the last cycle is measured by charging electric double layer capacitor cells manufactured according to the embodiment 1 and the comparative example 1 to 2.5V at constant current and constant voltage with a current density of 1 $mA/cm^2$ and discharging the cells at constant current of 1 $mA/cm^2$ three times after 30 minutes under the condition of a constant temperature of 25° C., and measurement results are shown in the following table 1.

Further, resistance of each cell is measured by an ampereohm meter and an impedance spectroscopy, and measurement results are shown in the following table 1.

TABLE 1

| Classification | Initial Capacity (F) | Resistance (AC ESR, mΩ) |
| --- | --- | --- |
| Comparative Example 1 | 1062 | 0.394 |
| Embodiment 1 | 1078 | 0.302 |

As in the results of the table 1, in case of the electrode in accordance with the embodiment 1, which is formed by coating the electrode active material after coating the conductive layer on the anode current collector, resistance is reduced by about 25% compared to the electrode in accordance with the comparative example 1, which does not have the conductive layer. By using this, it is possible to improve a withstand voltage by making a difference in the resistance between the cathode and the anode to adjust the potential difference of the cell, thereby improving energy density of the cell.

According to the present invention, the resistance of the anode is reduced through a change of the electrode structure of the cathode and the anode by applying the conductive layer on the anode current collector and applying the anode active material on the conductive layer. Therefore, it is possible to minimize capacity reduction compared to conventional methods and improve the energy density of the cell by improving the withstand voltage of the cell.

What is claimed is:

1. An electric double layer capacitor, comprising:
   an anode including an anode current collector, a conductive layer disposed on the anode current collector, and an anode active material layer disposed on the conductive layer; and
   a cathode including a cathode current collector, and a cathode active material layer disposed on the cathode current collector, wherein:
   the conductive layer includes a conductive material with electrical conductivity of $10^{-2}$ to $10^{-3}$ S/m, and
   the cathode is free of a conductive layer including a conductive material with electrical conductivity of $10^{-2}$ to $10^{-3}$ S/cm.

2. The electric double layer capacitor according to claim 1, wherein the conductive material of the anode includes at least one selected from the group consisting of ketjen black, acetylene black, and carbon black.

3. The electric double layer capacitor according to claim 1, wherein the conductive layer of the anode has a thickness of 1 to 15 μm.

4. The electric double layer capacitor according to claim 1, wherein the anode current collector includes a material selected from at least one metal selected from the group consisting of aluminum, stainless steel, copper, nickel, and alloys thereof, etched metal, expanded metal, punched metal, nets, and foam.

5. The electric double layer capacitor according to claim 1, wherein the cathode current collector includes a material selected from at least one metal selected from the group consisting of aluminum, stainless steel, titanium, tantalum, and niobium, etched metal, expanded metal, punched metal, nets, and foam.

6. The electric double layer capacitor according to claim 1, wherein:
   the anode active material and the cathode active material are the same as or different from each other, and
   each of the anode active material and the cathode active material is at least one carbon material selected from the group consisting of activated carbon, carbon nanotube (CNT), graphite, carbon aerogel, polyacrylonitrile (PAN), carbon nanofiber (CNF), activated carbon nanofiber (ACNF), vapor grown carbon fiber (VGCF), and graphene.

7. The electric double layer capacitor according to claim 1, wherein the anode active material and the cathode active material are activated carbon with a specific surface area of 1,500 to 3,000 m²/g.

8. The electric double layer capacitor according to claim 1, wherein the cathode is free of a conductive layer including a conductive material with electrical conductivity of $10^{-2}$ to $10^{-3}$ S/cm between the cathode current collector and cathode active material layer.

* * * * *